(12) United States Patent
Moradi et al.

(10) Patent No.: US 11,668,652 B2
(45) Date of Patent: Jun. 6, 2023

(54) OPTICAL FIBER-BASED SENSOR FOR DETERMINING THE CONCENTRATION OF FLUORIDE IN WATER

(71) Applicants: Vahid Moradi, Victoria (CA); Peter M. Wild, Victoria (CA); Heather L. Buckley, Victoria (CA)

(72) Inventors: Vahid Moradi, Victoria (CA); Peter M. Wild, Victoria (CA); Heather L. Buckley, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 539 days.

(21) Appl. No.: 16/742,622

(22) Filed: Jan. 14, 2020

(65) Prior Publication Data
US 2020/0225154 A1    Jul. 16, 2020

Related U.S. Application Data

(60) Provisional application No. 62/792,333, filed on Jan. 14, 2019.

(51) Int. Cl.
*G01N 21/49* (2006.01)
*F21V 8/00* (2006.01)
*G01N 21/47* (2006.01)

(52) U.S. Cl.
CPC ........... *G01N 21/49* (2013.01); *G01N 21/474* (2013.01); *G02B 6/0005* (2013.01); *G01N 2021/4742* (2013.01)

(58) Field of Classification Search
CPC .............. G01N 21/49; G01N 21/474; G01N 2021/4742
See application file for complete search history.

(56) References Cited

U.S. PATENT DOCUMENTS

| | | | | |
|---|---|---|---|---|
| 4,666,672 A | * | 5/1987 | Miller | G01N 21/643 422/82.07 |
| RE33,064 E | * | 9/1989 | Carter | G01N 21/7703 422/402 |
| 5,015,843 A | * | 5/1991 | Seitz | G01N 33/54373 436/805 |
| 5,176,881 A | * | 1/1993 | Sepaniak | G01N 21/7703 422/82 |
| 5,569,923 A | * | 10/1996 | Weissman | G01N 21/474 250/341.2 |
| 6,694,067 B1 | * | 2/2004 | O'Keefe | G02B 6/02033 385/12 |
| 2002/0026106 A1 | * | 2/2002 | Khalil | G01N 21/4795 600/310 |

(Continued)

OTHER PUBLICATIONS

Narayanaswamy, R. et al., "Optical-Fibre Sensing of Fluoride Ions in a Flow-Steam", Taianta 35(2) 83-88 (Year: 1988).*

(Continued)

*Primary Examiner* — Blake C Riddick
(74) *Attorney, Agent, or Firm* — Klarquist Sparkman, LLP

(57) ABSTRACT

A fluoride sensor includes an aluminum layer situated on a distal end face of an optical fiber. A light source directs light into the optical fiber at a proximal end and reflected light from the aluminum layer at the distal end face is directed by the fiber to a detector. A rate of change of a detector signal is processed to produce an estimate of a concentration of fluoride.

21 Claims, 8 Drawing Sheets

(56) References Cited

U.S. PATENT DOCUMENTS

| | | | |
|---|---|---|---|
| 2002/0055671 A1* | 5/2002 | Wu | A61B 5/1491 600/310 |
| 2004/0036028 A1* | 2/2004 | Tao | G01N 21/33 250/373 |
| 2005/0034985 A1* | 2/2005 | Zamanzadeh | G01N 27/4045 204/431 |
| 2005/0069932 A1* | 3/2005 | Arinaga | G01N 21/6452 435/6.12 |
| 2005/0157304 A1* | 7/2005 | Xiao | G01N 21/552 356/446 |
| 2005/0260677 A1* | 11/2005 | Saaski | G02B 6/4206 435/7.1 |
| 2006/0173256 A1* | 8/2006 | Ridder | G01N 21/274 600/316 |
| 2006/0216194 A1* | 9/2006 | Meyerhoff | G01N 31/22 422/504 |
| 2009/0018415 A1* | 1/2009 | Robinson | G01J 3/0224 600/310 |
| 2009/0116015 A1* | 5/2009 | Petrich | G06T 7/0012 356/416 |
| 2011/0097755 A1* | 4/2011 | Nomura | G01N 33/528 435/14 |
| 2011/0282167 A1* | 11/2011 | Ridder | G01J 3/0229 600/322 |
| 2012/0078473 A1* | 3/2012 | Ridder | A61B 5/1455 701/45 |
| 2013/0248697 A1* | 9/2013 | Egalon | G01N 21/76 385/12 |
| 2014/0303463 A1* | 10/2014 | Robinson | G01J 3/02 600/316 |
| 2016/0139042 A1* | 5/2016 | Gulati | A61B 5/1455 250/341.1 |
| 2017/0261485 A1* | 9/2017 | Panella | G01N 33/2841 |
| 2018/0070868 A1* | 3/2018 | Lin | G01J 3/2823 |
| 2018/0335383 A1* | 11/2018 | Lin | G01N 33/03 |
| 2019/0383664 A1* | 12/2019 | O'Dowd | G01D 18/004 |

OTHER PUBLICATIONS

Narayanaswamy, R. et al., "Optical Fibre Sensors in Chemical Analysis", Analytical Proceedings 22 204-206 (Year: 1985).*

Anzenbacher et al., "Simple Electrooptical Sensors for Inorganic Anions," *Organic Letters*, 7(22):5027-5030 (Aug. 17, 2005).

Bao et al., "A "naked eye" and ratiometric fluorescent chemosensor for rapid detection of F-based on combination of desilylation reaction and excited-state proton transfer," *Chem. Commun.*, 47(13):3957-3959 (Jan. 24, 2011).

Dhillon et al., "Analytical methods for determination and sensing of fluoride in biotic and abiotic sources: a review." *Analytical Methods*, 8(27):5338-5352 (Jun. 7, 2016).

Fluoride, SPADNS Method (0.1 to 2.0 mg/L), Hach Company, AccuVac® Ampuls: USA, pp. 211-217 (2017).

Hussain, et al., "Low-Cost, Robust, and Field Portable Smartphone Platform Photometric Sensor for Fluoride Level Detection in Drinking Water," *Analytical Chemistry*, 89(1):767-775 (Jan. 3, 2017).

Jadhav et al., "Fluoride contamination sensor based on optical fiber grating technology," *Optical Fiber Technology*, 38:136-141 (Sep. 14, 2017).

Kage et al., "Determination of fluoride in human whole blood and urine by gas chromatography-mass spectrometry," *Forensic Toxicology*, 26(1):23-26 (Apr. 9, 2008).

Levin et al., "Monitoring of fluoride in water samples using a smartphone," *Science of the Total Environment*, 551-552:101-107 (Jan. 24, 2016).

Li et al., "Self-Assembly of Graphene Oxide with a Silyl-Appended Spiropyran Dye for Rapid and Sensitive Colorimetric Detection of Fluoride Ions," *Analytical Chemistry*, 85(23):11456-11463 (Oct. 29, 2013).

Venkataraj et al., "Chemically Tapered Multimode Optical Fiber Probe for Fluoride Detection Based on Fluorescence Quenching of Curcumin," *IEEE Sensors Journal*, 15(10):5584-5591 (Oct. 2015).

Vidal et al., "Micropaper-based analytical device (μPAD) for the simultaneous determination of nitrite and fluoride using a smartphone," *Microchemical Journal*, 143:467-473 (Aug. 23, 2018).

Wen et al., "Microaxicave colour analysis system for fluoride concentration using a smartphone," *Royal Society of Chemistry*, 7(67):42339-42344 (Aug. 27, 2017).

Xiong et al., "Optical sensor for fluoride determination in tea sample based on evanescent-wave interaction and fiber-optic integration," *Talanta*, 174:372-379 (Jun. 10, 2017).

* cited by examiner

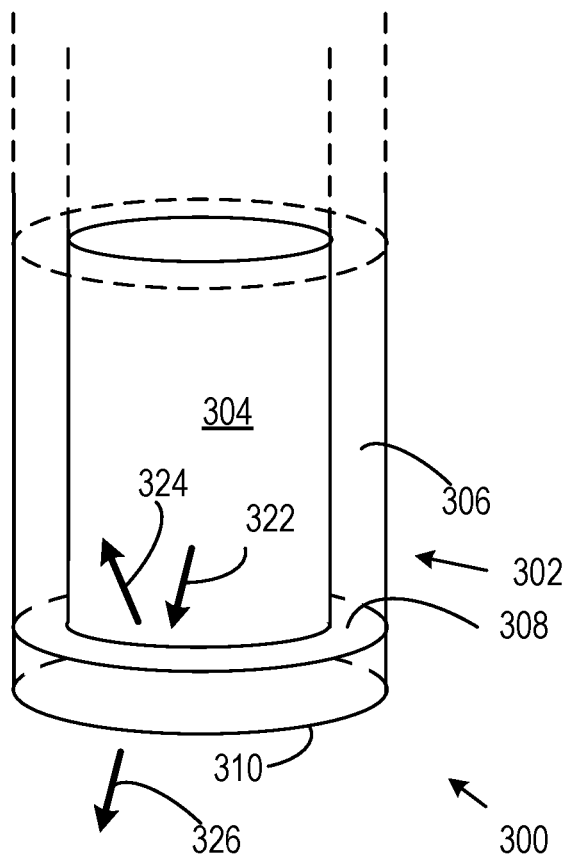

FIG. 3

| Fluoride concentration (mgL$^{-1}$) | Voltage rate ($\Delta V/\Delta t$) | Standard deviation | Linear regression coefficient ($R^2$) |
|---|---|---|---|
| 0 | $-1.6 \times 10^{-4}$ mVs$^{-1}$ | $\pm 3.3 \times 10^{-5}$ | 0.999 |
| 1 | $-2.7 \times 10^{-4}$ mVs$^{-1}$ | $\pm 1.7 \times 10^{-4}$ | 0.997 |
| 2 | $-5.4 \times 10^{-4}$ mVs$^{-1}$ | $\pm 3.3 \times 10^{-4}$ | 0.999 |
| 3.5 | $-1.2 \times 10^{-3}$ mVs$^{-1}$ | $\pm 3.8 \times 10^{-4}$ | 0.999 |
| 5 | $-2.3 \times 10^{-3}$ mVs$^{-1}$ | $\pm 1.7 \times 10^{-4}$ | 0.999 |
| 10 | $-1.7 \times 10^{-2}$ Vs$^{-1}$ | $\pm 5.0 \times 10^{-3}$ | 0.999 |
| 20 | $-1.8 \times 10^{-2}$ Vs$^{-1}$ | $\pm 5.1 \times 10^{-3}$ | 0.999 |
| 40 | $-1.9 \times 10^{-2}$ Vs$^{-1}$ | $\pm 7.1 \times 10^{-3}$ | 0.999 |
| 80 | $-2.3 \times 10^{-2}$ Vs$^{-1}$ | $\pm 1.1 \times 10^{-3}$ | 0.994 |

FIG. 9

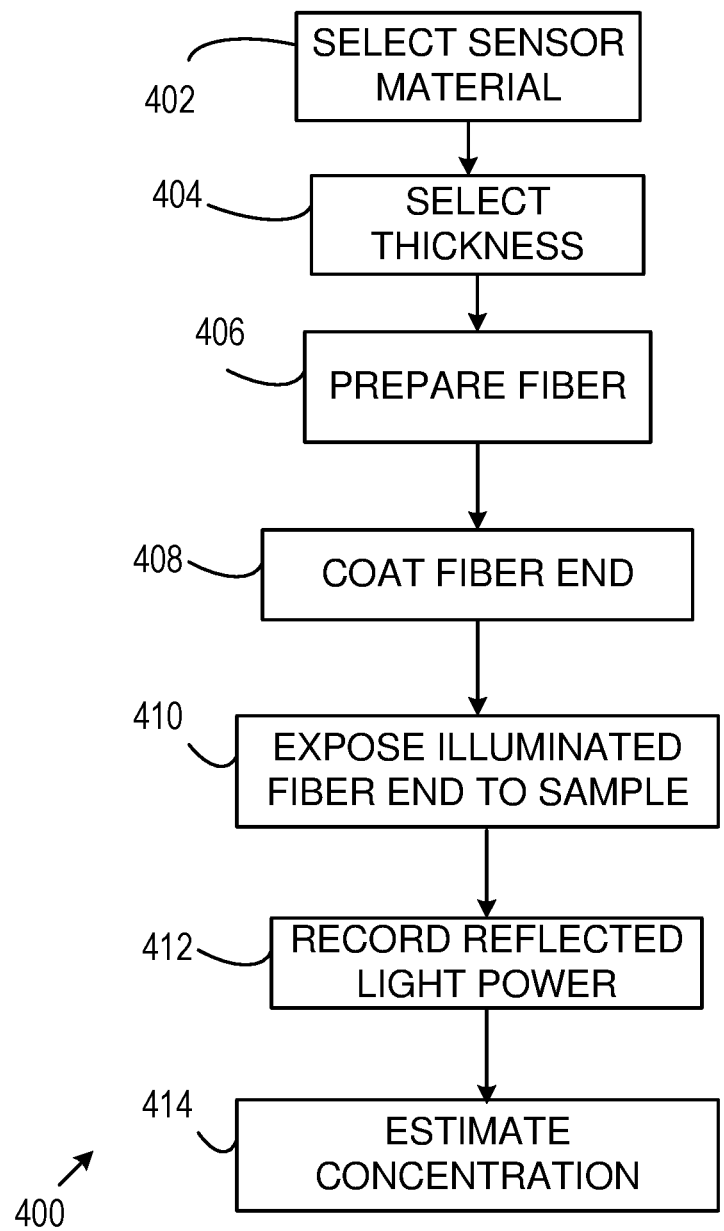

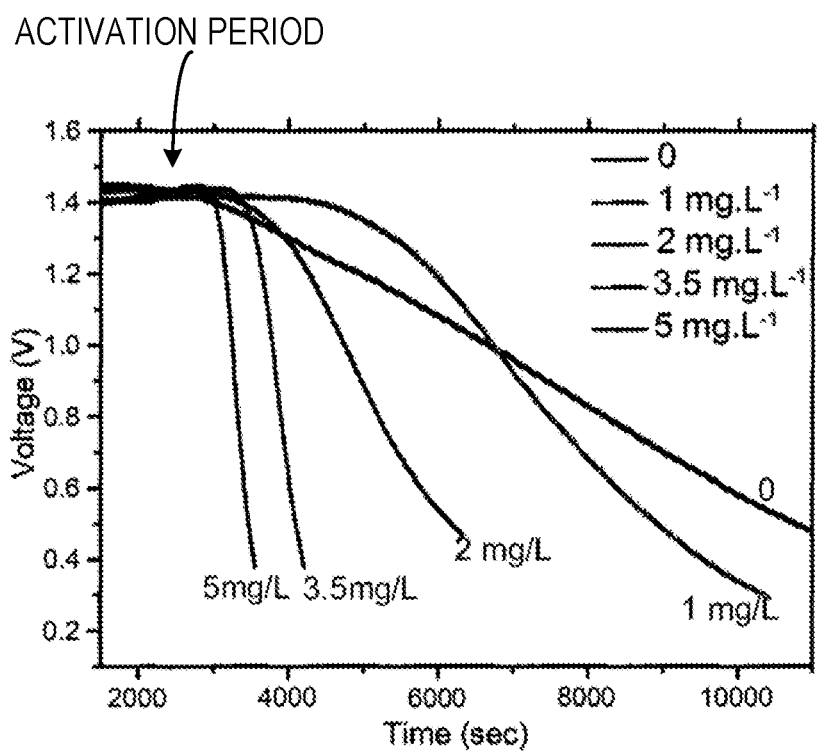
FIG. 5
FIG. 6
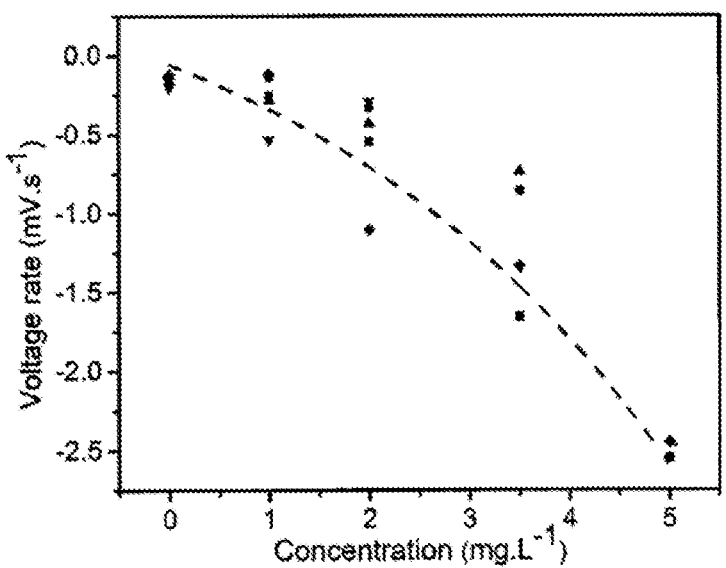

OPTICAL FIBER-BASED SENSOR FOR DETERMINING THE CONCENTRATION OF FLUORIDE IN WATER

CROSS REFERENCE TO RELATED APPLICATION

This application claims the benefit of U.S. Provisional Application No. 62/792,333, filed Jan. 14, 2019, which is hereby incorporated by reference in its entirety.

FIELD

The disclosure pertains to optical sensor systems.

BACKGROUND

In regions of the world where groundwater is the main source of drinking water, most notably in the African Rift Valley and parts of India, Sri Lanka and Northern China, over 200 million people consume water with naturally-occurring fluoride levels exceeding the WHO-recommended limit of 1.5 mg/L. While optimal low concentrations (0.5-1 mg/L) prevent dental caries, higher concentrations (>1.5 mg/L) can lead to dental and skeletal fluorosis. Managing the concentration of fluoride in drinking water supplies is crucial, and reliable, frequent measurement is essential to the effective provision of safe drinking water.

Various methods are currently used to measure the concentration of fluoride in water such as ion-selective electrodes, mass spectroscopy, UV-visible spectroscopy, and fluorescence techniques. However, these methods are generally unsuitable for field testing as they require careful preparation and analysis in a laboratory setting. For communities in low-resource contexts, there is a need for a robust device that can be used in the field, such as a handheld sensor.

The current industry standard for field measurement of fluoride is the HACH kit SP ADNS method. This method measures the reaction of a red zirconium dye with fluoride in solution using a pocket colorimeter. This method can measure fluoride in the range of 0.1-2 mg/L with a high sensitivity, but is limited by manipulation of liquid reagents and possible contamination of glassware and equipment. Additionally, the SP ADNS reagent for fluoride contains sodium arsenite, which is hazardous and must be disposed of as such.

Various alternative fluoride detection methods have been developed that involve cell phone-compatible measurement kits, some of which are commercially available. In most examples, water mixed with a liquid reagent inside a sample chamber can be characterized using the camera on a smart phone, and then the images are analyzed using custom software. Vidan et al. react fluoride with SPADNS and Greiss (for nitrite detection) reagents on filter paper rather than in solution, again using a cell phone camera and image processing software to quantify the analytes. These methods are limited by the requirement of manipulating and disposing liquid reagents and contamination between samples; photos of samples are also subject to variability in lighting and image quality.

Optical fiber technologies present alternative approaches for fluoride detection. Venkataraj et al. chemically tapered a multimode fiber and used curcumin fluorescence quenching to measure the concentration of fluoride in organic solvents. S. Jadhav et al. used shift in Bragg wavelength to measure the concentration of fluoride in the presence of fluoride reagents. An optical sensor was developed by Xion et al. to measure the concentration of fluoride using a colorimetric method through reaction of fluoride with reagents on the surface of a fiber in a microfluidic channel. However, all these methods require time-consuming and complicated fabrication steps. Moreover, they require expensive detectors and spectrometers. Hence, a sensor, which is easy to fabricate and does not require expensive optical parts is needed.

SUMMARY

Disclosed herein are methods and apparatus that can provide simple, inexpensive measurement of, for example, fluoride concentrations. According to a representative embodiment, a portion of a single mode optical fiber is coated with aluminum using sputter deposition, evaporation, chemical deposition, or otherwise coated. Immersion of the coated fiber portion in a fluoride solution then leads to removal or modification of the coating due to the reaction between fluoride and aluminum. The removal/modification of the coating affects the reflectance of light to the detector and the rate of aluminum removal/modification is typically proportional to the concentration of fluoride up to at least 5 ppm, allowing simple, reagent-free quantitation of fluoride concentrations in water. In some examples, transmitted light can be used, and sensor plates can be provided that are visually interpretable, as needed.

In some examples, sensor include a light guide having a proximal surface and a distal surface, wherein the distal surface is situated to receive light directed into the light guide at the proximal surface. A sensor material responsive to a selected analyte is situated to receive light from the distal surface of the light guide. A detector is optically coupled to the sensor material to receive light from the sensor material. A sensor processor is coupled to the detector to receive an indication of a sensor material response to the selected analyte and configured to determine an analyte concentration based on a rate of change of an optical property of the sensor material upon exposure to the analyte. According to some embodiments, the optical property is transmittance, reflectance, or scattering, and the sensor material is an aluminum layer having a thickness of between 15 nm and 500 nm. In other alternatives, the light guide is an optical fiber, and the sensor material is situated on the distal surface. In further examples, the distal surface is a cleaved or polished surface of the light guide.

In some examples, the sensor processor determines the rate of change of the optical property based on a slope of a selected portion of an optical response as a function of time. The selected portion of the optical response as a function of time typically extends between an upper limit that is less than 90% of a peak optical response and a lower limit that is more than 10% of the peak optical response, and generally after an activation period. In other examples, the selected portion of the optical response as a function of time extends between an upper limit that is less than 85% of a peak optical response and a lower limit that is more than 20% of the peak optical response. According to other embodiments, the sensor processor determines the rate of change of the optical property by determining a time associated with a specified change in the optical response, such as a decrease to 50% of a peak optical response.

Methods include exposing a metallic layer to a sample and directing light to the metallic layer and receiving a portion of the light from the metallic layer. A change in the portion of the light received from the metallic layer in an exposure time interval is determined, Based on the change in the portion of the light received from the metallic layer, an analyte concentration in a sample or a presence of an analyte in a sample is indicated. In some examples, the received portion is reflected, transmitted, or scattered by the metallic layer. According to some examples, the analyte concentration or the presence of an analyte is based on slopes of a linear portion of optical responses to a plurality of analyte concentrations. In a particular example, the metallic layer is an aluminum layer having a thickness between 10 nm and 50 nm. In some embodiments, the metallic layer is situated on an end face of an optical fiber, and the light is directed to the metallic layer by the optical fiber. In a representative example, the received portion of the light is a reflected portion that is directed to the detector through the optical fiber which can be a single mode fiber or a multimode fiber. In other representative examples, the analyte concentration or presence of the analyte is indicated based on slopes of portions of the sensor detection signals as functions of exposure time corresponding to optical responses to a plurality of analyte concentrations, wherein the portions of the sensor detection signals are associated with sensor detection signals between 10% and 90%, 15% and 85%, 20% and 80%, or 25% and 75% of a maximum sensor detection signal.

Sensor systems comprise a light source adapted to produce light in a wavelength range of 1.0 µm to 1.7 µm and an optical fiber coupler situated to receive the light from the light source. An optical fiber has a proximal surface situated to receive the light from the optical fiber coupler and a planar distal surface that is perpendicular to an axis of the optical fiber. An aluminum layer or other metallic layer is situated on the distal surface of the optical fiber and has a thickness of between 30 nm and 40 nm. A detector is optically coupled to the optical fiber coupler and situated to receive light portions returned from the metal layer and produce a sensor detection signal. A sensor processor is coupled to the detector to receive the sensor detection signal and produce an indication of an analyte concentration based on a rate of change of the sensor detection signal.

The foregoing and other objects, features, and advantages will become more apparent from the following detailed description, which proceeds with reference to the accompanying figures.

BRIEF DESCRIPTION OF THE DRAWINGS

FIG. 3 illustrates an optical fiber sensor tip.
FIG. 4 illustrates a representative method.
FIG. 5 illustrates sensor characterization using solutions with fluoride concentrations of 0, 1, 2, 3.5, and 5 mg/L. Sensor detection signal as a function of time is graphed.
FIG. 6 illustrates sensor detection signal decay rate as a function of fluoride concentration based on the data of FIG. 5.
FIG. 9 is a table of values of sensor detection signal decay rate $\Delta V/\Delta t$ for fluoride concentrations between 0 and 80 mg/L.

DETAILED DESCRIPTION

General Considerations

Figure 1:
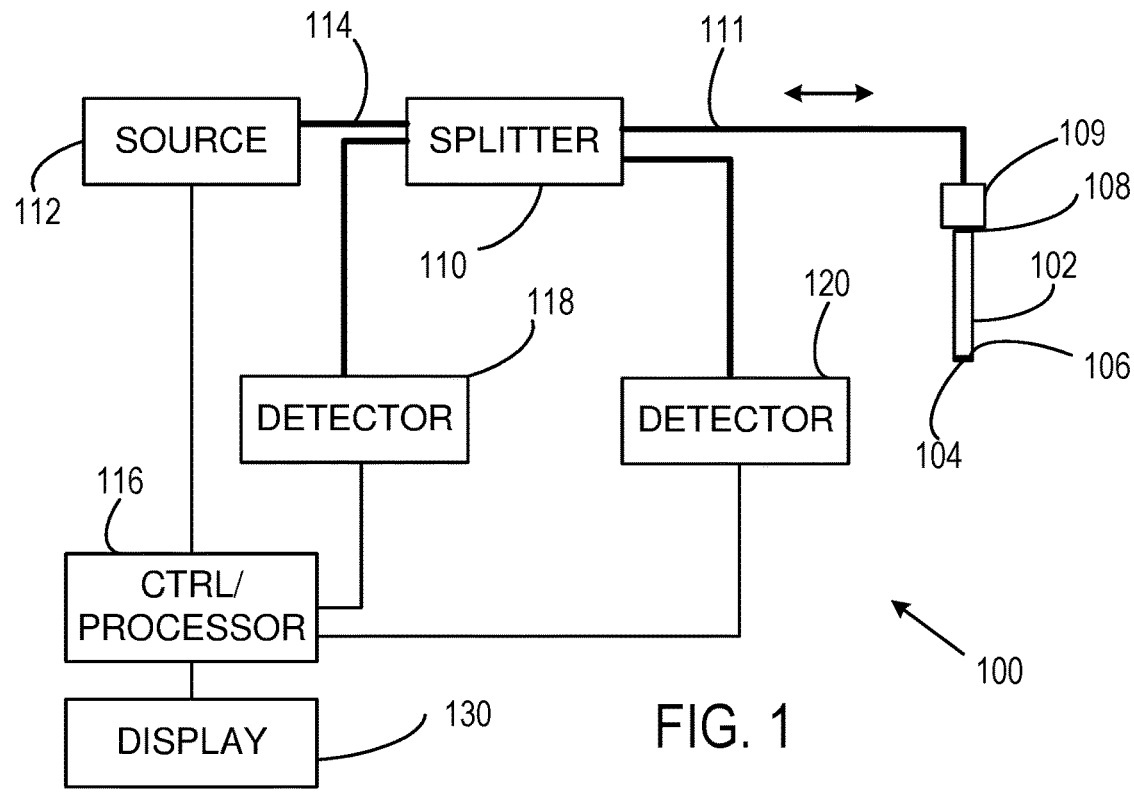
FIG. 1 illustrates a representative sensor.

In the following description, the term "light" is used to refer to electromagnetic radiation, typically in a wavelength range from about 200 nm to about 2 µm, and in some examples, between about 800 nm and 1.6 µm, but other wavelength ranges can be used. Optical detectors that receive light are referred to as producing "detection" signals which can be currents or voltages that are related to received light power. Such signals can be amplified or otherwise processed, and are referred to as detection signals after amplification or processing as well. In many examples, a detection signal value is proportional to received light power, but nonlinear responses can be used.

While optical fibers are convenient, other light guides can be used such as single mode or multimode plastic or glass optical fibers, planar waveguides, hollow light guides, glass or plastic rods or other shapes, or combinations of prisms, mirrors, lenses and other optical components can be used, in addition to light guides and optical fiber components. In typical examples, sensor materials and associated optics are situated to sense analytes based on light reflection from a sensor material. In other examples, transmitted or scattered light can be used for sensing, but reflected light can be particularly convenient.

In some examples, one or more optical detectors is situated to monitor light power from a source so that such power variations can be compensated and do not appear as actual sensor responses. Rates of change of sensor detection signals are generally referred to as signal decays in examples based on reflection from a sensor layer. For examples in which transmitted light is used, rates of change of detection signal can be referred to as signal growth. In most examples, a change of detection signal $\Delta S$ in a specific time interval $\Delta t$ (i.e., $\Delta S/\Delta t$) is used to characterize and calibrate sensor materials. In some examples, measured values of $\Delta S/\Delta t$ for a specific time interval are used for sample assessment. In other examples, a time for a detection signal to change a predetermined amount can be used.

It can be convenient to provide a layer of a sensor material on a planar surface of a light guide or optical fiber at distal end, such as on polished or cleaved surface. If convenient, an optical fiber or light guide can be retained in a sleeve, ferrule, or fiber connectors and an exposed fiber end provided with a layer of sensor material. In the disclosed embodiments, aluminum is used as a sensor material, but other metals and combinations of metals can be used. Metals that exhibit a selected reaction rate with a fluoride or other analyte can be used to provide a suitable time response and sensitivity. For example, more reactive materials can be used to provide a more rapid response or less reactive coatings can be used to provide a slower response. Mixtures of materials may be useful in customizing temporal response. Polymer coatings can also be applied as layers or can be drop cast. Typical analytes include chloride, bromide, iodide and other species that interact with a selected coating.

In the drawings, arrows are used in some examples to illustrate the directions of light propagation, and optical paths in light guides are generally indicated with darker line segments than electrical connections.

Example 1

Referring to FIG. 1, a representative sensor 100 includes a light guide 102 having a sensor material 104 situated at a distal end 106. A proximal end 108 is coupled to a light guide coupler such as an optical fiber connector 109 and to a light guide 111 that is coupled to a beam splitter 110. The beam splitter 110 can be conveniently provided as a fiber coupler having 50%/50% splitting ratio or other splitting ratio. A light source 112 such as a broadband source, an LED, a laser diode, a lamp, or other light source is optically coupled to the beam splitter 110 with an optical fiber 114, other light guide, or with one or more lenses, prisms, mirrors, or other free space optical elements. The light source 112 is coupled to a controller/processor 116 for activation of the light source 112. The controller 116 is also coupled to a sensor detector 118 that is coupled to the beam splitter 110. The beam splitter 100 directs direct light returned from the sensor material 104 to the sensor detector 118. In a typical example, reflectivity of the sensor material varies in response to analyte exposure, and a magnitude of the returned light power (or a rate of change of the magnitude) based on a sensor detection signal from the sensor detector 118 can be used by the controller/processor 116 to produce an estimate of analyte concentration. A reference detector 120 is situated to receive a portion of the light that is to be directed to the distal end 106 of the light guide 102. A reference detection signal can be produced by the reference detector 120 so that variations in light power unrelated to analyte interaction can be eliminated or reduced. Typically, the controller/processor 116 can produce a compensated detection signal as a ratio of the sensor detection signal to the reference detection signal, thereby reducing effects of amplitude variations in light power from the source 112. A reference detector is not necessary, however, and, if used, can be provided at the light source 112 or other locations.

The controller/processor 116 is configured to record variations in the returned light as a function of time, i.e., record the sensor detection signal as a function of time, or the ratio of the sensor detection signal to the reference detection signal, or record both the sensor detection signal and the reference detection signal. Based on a rate of change of the magnitude of the sensor detection signal, the controller/processor 116 produces an estimate of analyte concentration. The controller/processor 116 is also configured to activate the light source 112 and any detection electronics such a amplifiers, electrical filters, bias electronics and the like, if needed. In some cases, the controller/processor 116 is configured to reduce power use, especially in battery-powered applications or field applications. Analyte concentration determination is discussed in detail below. Detection signals and/or analyte concentration estimates can be presented on a display 130 or communicated electronically or direct to a printer or other destination.

Various sensor materials can be used and can be selected based on the analyte to be measured. For fluoride sensing, aluminum can be used, and is typically situated on the distal end 106 of the light guide 102. For example, an aluminum layer can be deposited on a flat light guide end such as a cleaved or polished end. The sensor material can be separate from the distal end 106 and is typically secured so that any variations in reflectance are associated with interaction with the analyte, and not mechanical disturbances.

Example 2

Figure 2:
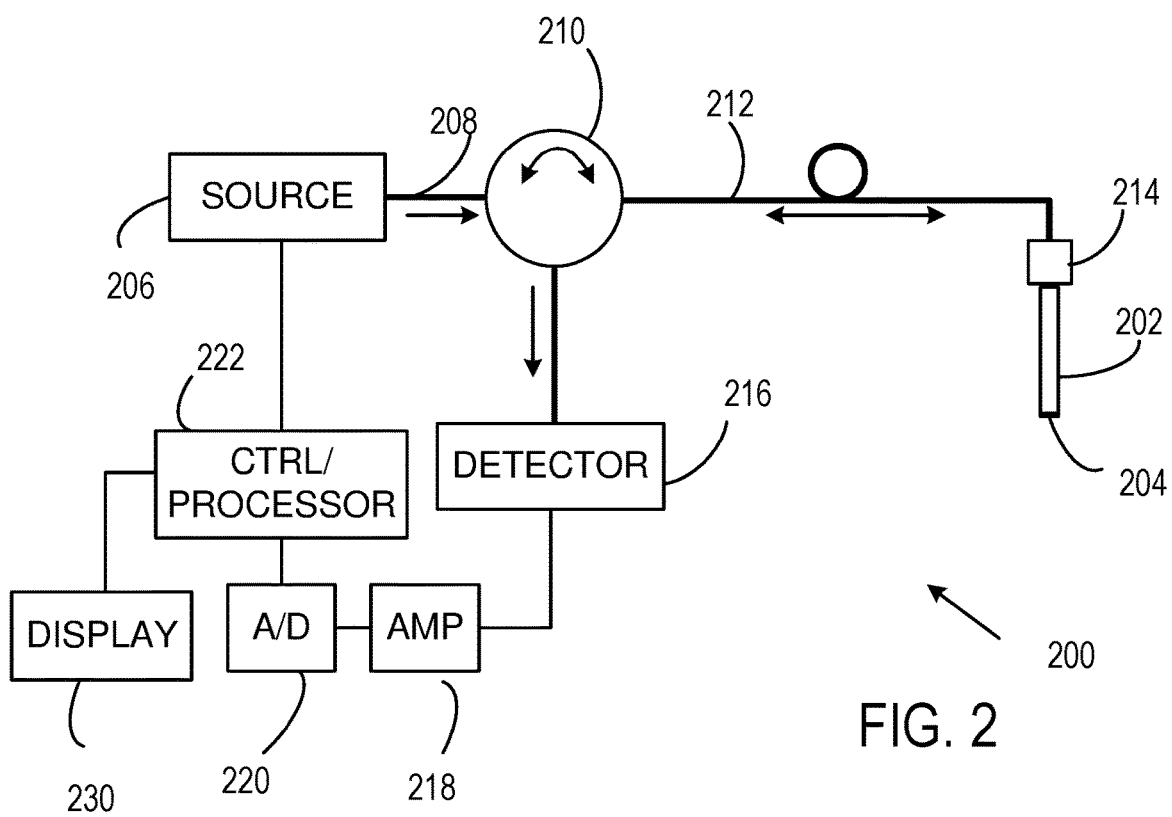
FIG. 2 illustrates another representative sensor.

Referring to FIG. 2, another representative sensor 200 includes an optical fiber 202 having sensor material 204 situated at a distal surface. A light source 206 is coupled to an optical fiber 208 and to an optical circulator 210 that couples light to an optical fiber 212 that is coupled to the optical fiber 202 with a fiber connector 214. Light reflected by the sensor material propagates back to the optical circulator 210 and is coupled to a sensor detector 216. A detector amplifier 218 amplifies or otherwise processes a detection signal from the sensor detector 216, and an analog-to-digital (A/D) convertor 220 is situated to produce a digital representation of the sensor detection signal which is then coupled to the controller/processor 222. Collected data and analyte concentration estimates can be presented to a user with a display 230. Use of an optical circulator can permit more light power to be delivered to the sensor material 204.

Example 3

Referring to FIG. 3, a representative sensor 300 includes an optical fiber 302 having a core 304 and a cladding 306. The optical fiber 302 is cleaved, polished, or otherwise processed to produce a planar distal surface 308 and a sensor material 310 is situated on the distal surface 308, typically as a sensor material layer of thickness of at least 5, 10, 15, 20, 25, 30, 35, 40, 45, or 50 nm and not greater 500, 400, 300, 250, 200, 100, 75, 50, or 25 nm. In some examples, thicknesses of between 30-40 nm provide superior analysis. Incident, reflected, and transmitted light portions are indicated schematically as 322, 324, 326, respectively. In other examples. The optical fiber 302 is retained in a ferrule or other support, and at least the core portion of the distal surface is coupled to a sensor material.

Example 4

Referring to FIG. 4, a representative method 400 includes selecting a sensor material at 400 and a thickness at 404. An optical fiber is prepared at 406, typically be forming a planar end surface. At 408, the fiber end surface is coated with the sensor material to the selected thickness. At 410, the fiber end is illuminated and exposed to a sample, and at 412, light from the sensor material is measured as a function of exposure time. At 414, an estimate of an analyte concentration is provided for a user. Analyte concentration is usually determined based on a rate of change of reflectivity of the sensor material however, any temporal variation of the sensor material reflectivity can be used as illustrated further in the examples below.

Example 5

In one example implementation, sodium fluoride (NaF, >0.99) was purchased from Sigma Aldrich and distilled water was used to prepare solutions with specific concentrations of fluoride. pH was not explicitly controlled, but was consistently measured to be between 6.44 for distilled water and 6.94 for 80 mg/L fluoride solution.

A sensor system such as illustrate above used a broadband light source (BBS 1550, AFC Technologies) with high output powers at 1310 nm and 1550 nm. Broadband light was fed into an optical splitter (BRR-355, Blue Road Research Inc.), which was coupled to a sensor fiber and an InGaAs photodiode detector and amplifier (FPD 510, MenloSystems) with spectral sensitivity in a range of 950-1650 nm. Reflected light from the tip of the optical fiber sensor was coupled to the photodiode to generate an analog output voltage. A data acquisition module (NI USB-6008, National Instruments) processed the analog output voltage and produced digital data that was coupled to a computing system.

Sensors were fabricated by sputter deposition (Mantis CUBE sputter deposition system) of a 35 nm layer of aluminum onto an end face of a 9/125 µm single mode optical fiber. The fiber end face was produced by cleaving a section of optical fiber, but the end face could be produced by polishing, etching, or other processes. For convenience, an opposite end of the optical fiber was connectorized with an FC/APC connector. In this example, the 35 nm thickness provided enough precision for the sensors, while preserving a relatively short response time when testing low concentrations of fluoride (0-5 ppm). Aluminum layers thinner than 35 nm tended to break down easily in contact with solutions, which caused imprecise results. Layers thicker than 35 nm led to response times that were significantly longer.

Example 6. Sensor Calibration

Sensor tips can be characterized by immersion in targets having different fluoride concentrations, such as 0, 1, 2, 5, 10, 20, 40, and 80 mg/L, but fewer or more targets can be used with different ranges. Reflected light from a sensor tip is measured, typically based on an analog voltage or other detection signal provided by a detector or detector amplifier. This analog voltage or detection signal is generally proportional to a total light flux received from the sensor tip. Reflected light amplitude declines over time upon exposure to a target. In some examples, reflected light amplitude declines even with exposure to samples without fluoride, and exposure to a sample should be timed so that this decline can be limited, avoided, or compensated. Light amplitude changes are typically in response to removal of the aluminum layer of the sensor tip by reaction with fluoride. Higher fluoride concentrations result in higher rates of removal of the aluminum layer and higher rates of decrease of the reflected light amplitude and the associated detection signal such as the analog voltage. The removal rate of aluminum is related to the concentration of fluoride in the solution and can be expressed in terms of a rate of detection signal decline such as the rate of change of an associated analog voltage signal, i.e., $\Delta V/\Delta t$. In one example, $\Delta V/\Delta t$ is obtained by fitting a straight line between suitable initial values and final values. In an example, shown in FIG. 5, analog voltages as functions of time for exposures to fluoride concentrations of 0 mg/L, 1 mg/L, 2 mg/L, 3.5 mg/L. and 5 mg/L were obtained, and straight lines were fitted between analog voltages of about 1.2 V and 0.6 V for each curve. Typically, normalized detection signals are used in ranges of greater than 0.15, 0.2, 0.25, 0.3, 0.4, or 0.5 and less than 0.9, 0.85, 0.8, 0.7, 0.65, 0.6, 0.55, or 0.5 of a maximum sensor detection signal. FIG. 5 illustrates detection signal decay as a function of time for these fluoride concentrations. In this voltage range all test curves are approximately linear, and different sensors with the same sensor tip coating operate similarly. The reaction removing aluminum from a fiber tip is irreversible; each sensor is only used once, and a set of sensors is used for calibration, with each sensor exposed to a selected fluoride concentration.

In FIG. 5, the response curves exhibit an initial period that exhibits little response. For convenience, this period is referred to as an activation period. For example, the curve associated with exposure to a fluoride concentration of 3.5 mg/L exhibits little response until after about 4000 sec, thus has an activation period of about 4000 sec. This may be due to an oxide or other coating or surface condition that limits exposure to the metallic sensor layer until this coating is removed. For example, an aluminum-coated sensor tip will generally have an aluminum oxide layer that may slow any reaction with a sample until removed. In some cases, this surface coating can be removed immediately prior to sensor use, while in other cases, even in removed, the surface coating returns rapidly, and removal prior to sample exposure may not be helpful. The activation period may be a function of temperature, humidity, or other factors unrelated to a measurement of interest. For this reason, in most applications, the portion of the response curve after the activation period is preferred for analyte measurement.

FIG. 6 illustrates sensor detection signal decay rate ($\Delta V/\Delta t$) as a function of fluoride concentration for concentrations up to 5 mg/L. The magnitude of the decay rate increases by two orders of magnitude from $1.6(10^{-5})$ mv/s to $1.2(10^{-3})$ mv/s with increasing fluoride concentrations in distilled water from 0 mg/L to 5 mg/L. The measured response data was used to generate an exponential fit for the response of the sensor in various fluoride concentrations. The obtained equation is as follows:

$$y = -9.158(10^{-4})e^{-x/(-3.84457)} + +8.91634(10^{-4})$$

wherein y is the voltage decay rate and x is fluoride concentration.

Figure 7:
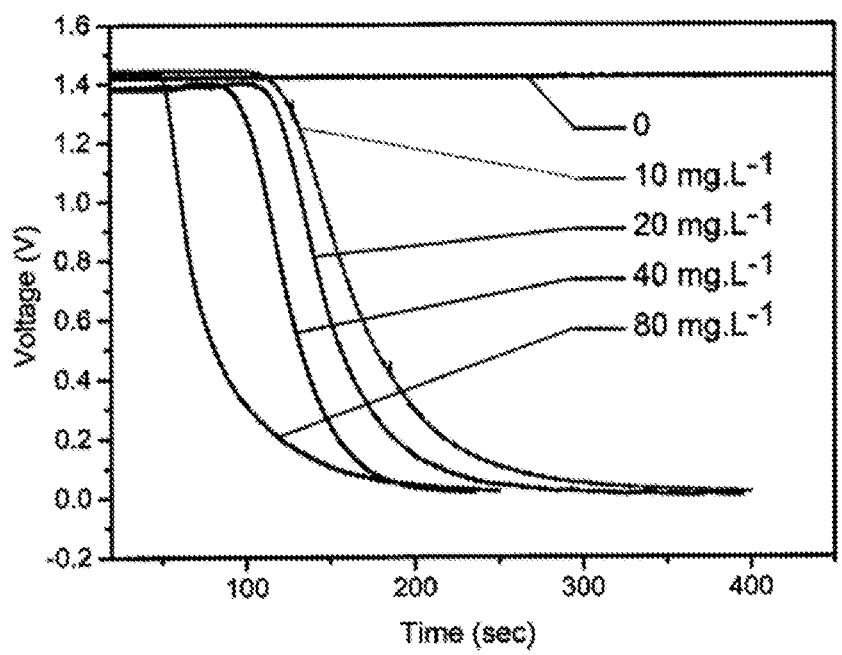
FIG. 7 illustrates sensor characterization using solutions with fluoride concentrations of 0, 10, 20, 20, and 80 mg/L. Sensor detection signal as a function of time is graphed.
Figure 8:
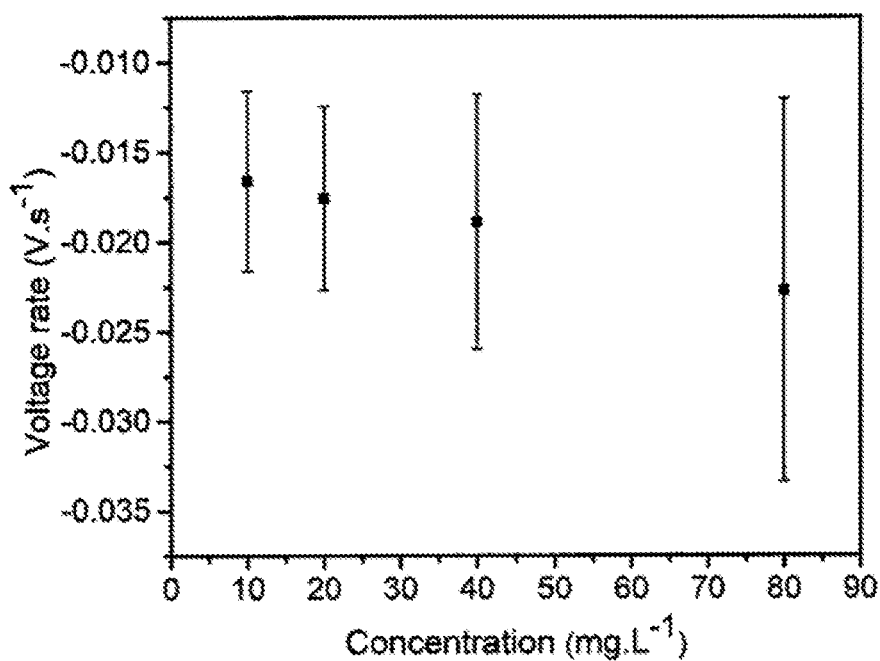
FIG. 8 illustrates sensor detection signal decay rate as a function of fluoride concentration based on the data of FIG. 7.

FIG. 7 illustrates sensor detection signal decay as a function of time for fluoride concentrations up to 80 mg/L and FIG. 8 illustrates sensor detection signal decay rate as a function of concentration for concentrations up to 80 mg/L. Due to the high reaction rates for these concentrations, the 35 nm layer thickness it not well suited for measuring such high concentrations. A thicker aluminum layer or selecting a metal that reacts more slowly with fluoride could improve the resolution of this type of sensor at high fluoride concentrations. However, for low-cost detection of fluoride in drinking water, resolution in the range spanning the 1.5 mgL-1 WHO recommended limit, a 35 nm thickness is suitable. FIG. 9 is a table summarizing signal decay rates for the various fluoride concentrations.

Example 7

Figures 10, 11:
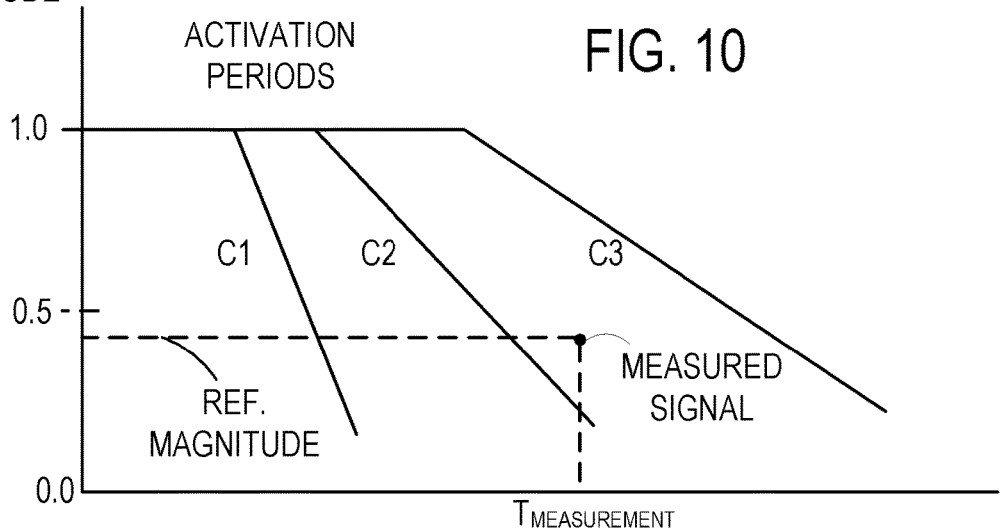
FIG. 10 illustrates concentration measurement based on sensor detection signal decay to predetermined values.
FIG. 11 illustrates a representative look-up table for a sensor.

While detection of signal decay rate can be used to produce an estimate of analyte concentration, other rate-dependent approaches can be used. FIG. 10 illustrates idealized sensor signal magnitude as a function of time for three representative concentrations C1, C2, C3. In the example of FIG. 10, reflected signal is measured, sensor signal decreases as a function of time, and C1>C2>C3. In examples using transmitted signal magnitude, sensor signal magnitude would be increasing as a function of time. In other alternatives, removal of a surface coating can increase or decrease scattered light. For example, a surface coating that is applied to a roughened surface can produce increased scattering as the surface coating is removed. Alternatively, the surface coating can be roughed or patterned, so that light scattering decreases in response to the analyte. In these examples, detection of transmitted, reflected, or scattered light can be used to measure analyte concentrations as may be convenient.

As shown in FIG. 10, a sensor detection signal normalized magnitude (hereinafter "reference magnitude") can be selected such as, for example, 0.75, 0.50, or 0.25. An exposure time ($T_{MEASURED}$) required for the sensor detection signal to decrease to the selected reference magnitude is measured. In some examples, the exposure time is preferably measured after the end of the activation period. In the example of FIG. 10, $T_{MEASURED}$ is associated with a concentration between C2 and C3; interpolation can be used to produce an improved estimate. Other reference magnitudes can be used, and concentrations can be estimated using a set of stored concentration values as functions of time for the one or more of the reference magnitudes. Concentration as a function of exposure time for one or more reference magnitudes can be fit to a suitable curve so that concentration can be computed. FIG. 11 is a representation of a portion of a suitable look-up table for a single reference magnitude Additional data for other reference magnitudes can be included. In other examples, an exposure time can be selected, and a sensor signal magnitude measured at this time used to estimate concentration. Such approaches typically require repeatable activation periods, and approaches based only on sensor response after the activation period are generally preferred.

Example 8

Figure 12:
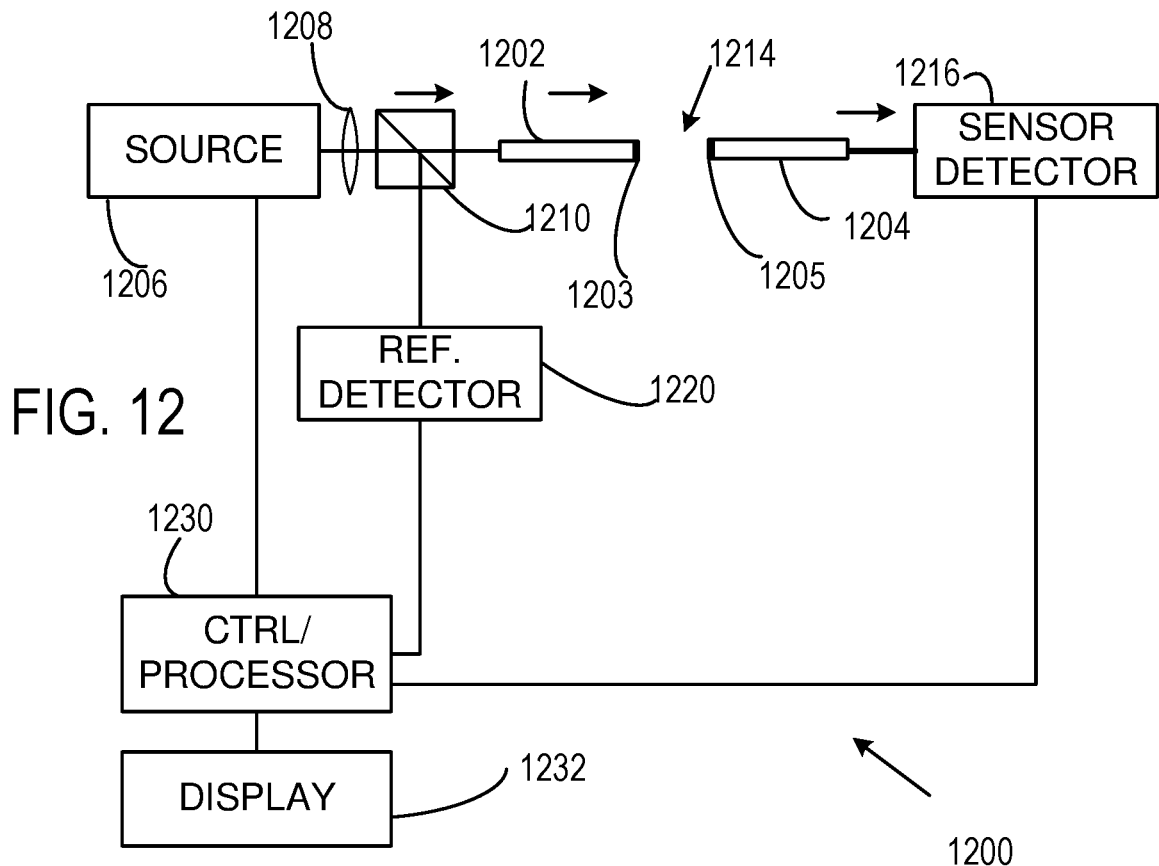
FIG. 12 illustrates a representative sensor that include two sensors arranged to use transmitted light for sensing.

Referring to FIG. 12, in another example a sensor system 1200 includes a first sensor fiber 1202 and a second sensor fiber 1204 having respective sensor coatings 1203, 1205 on facing fiber surfaces. A light source 1206 directs light through a lens 1208 and a cube beam splitter 1210 to the first sensor fiber 1202 and through an analyte volume 1214 to the second sensor fiber 1204. The transmitted light is received by a detector 1216 and a reference light portion is coupled to a reference detector 1220, which can be omitted. A controller/processor 1230 is coupled to the sensor detector 1216 and produces an indication of analyte concentration that can be coupled to a display 1232.

Example 9

Figure 13:
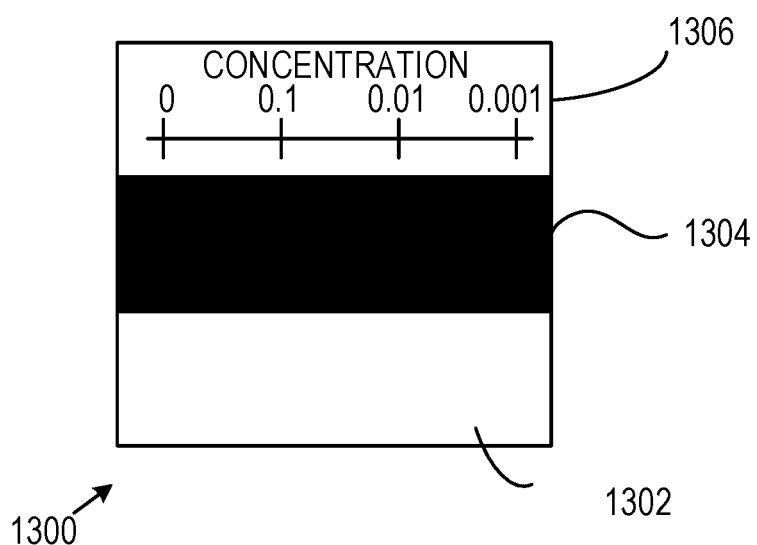
FIG. 13 illustrates a representative sensor plate.

Referring to FIG. 13, a sensor plate 1300 includes a sensing region 1302 that includes, for example, an aluminum sensing layer, and a reference region 1304 that displays a reflectivity gradient that is fixed for comparison to reflectivity produced by exposing the sensing region 1302 to the analyte. By comparing reference region reflectivity to the reflectivity gradient, a user can select a comparable reflectivity. An index region 1306 can be marked with a scale indicating concentrations associated with the gradient levels on the reference region 1304. A user merely exposes the sensing region 1302 for a predetermined time and then makes a visual comparison.

Example 10

Figure 14:
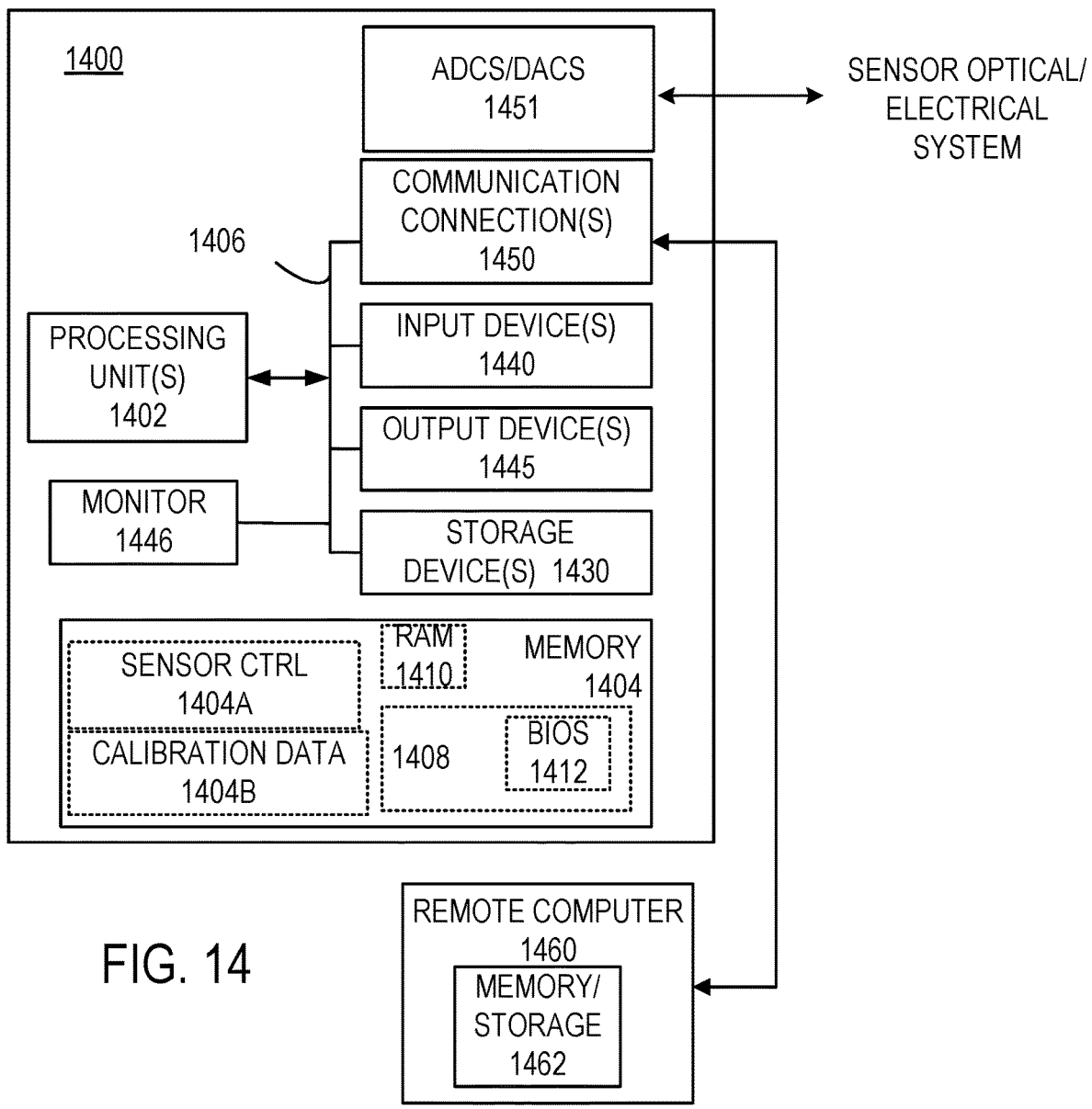
FIG. 14 illustrates representative processor systems for use with the disclosed methods and apparatus.

FIG. 14 and the following discussion are intended to provide a brief, general description of an exemplary computing environment in which the disclosed technology may be implemented. The disclosed technology may be implemented with other computer system configurations, including hand-held devices such as smart phones, multiprocessor systems, microprocessor-based or programmable consumer electronics, network PCs, minicomputers, mainframe computers, programmable logic devices, gate arrays, complex programmable logic devices (CPLDs), application specific integrated circuits (ASICs), tablet computers, and the like. The disclosed technology may also be practiced in distributed computing environments where tasks are performed by remote processing devices that are linked through a communications network. In a distributed computing environment, program modules may be located in both local and remote memory storage devices. In typical examples hand-held or other portable processing devices are used for data analysis, data capture and other tasks, or such processing is built into a dedicated CPLD or other device(s) for inclusion in a compact, portable test instrument. Calibration and manufacturing procedures do not generally require portability, and a desktop or laptop computer based system can be convenient.

With reference to FIG. 14, an exemplary system for implementing the disclosed technology includes a general purpose computing device in the form of an exemplary conventional PC 1400, including one or more processing units 1402, a system memory 1404, and a system bus 1406 that couples various system components including the system memory 1404 to the one or more processing units 1402. The system bus 1406 may be any of several types of bus structures including a memory bus or memory controller, a peripheral bus, and a local bus using any of a variety of bus architectures. The exemplary system memory 1404 includes read only memory (ROM) 1408 and random access memory (RAM) 1410. A basic input/output system (BIOS) 1412, containing the basic routines that help with the transfer of information between elements within the PC 1400, is stored in ROM 1408.

The exemplary PC 1400 further includes one or more storage devices 1430 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). The drives and their associated computer-readable media provide nonvolatile storage of computer-readable instructions, data structures, program modules, and other data for the PC 1400. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1430 including an operating system, one or more application programs, other program modules, and program data. A user may enter commands and information into the PC 1400 through one or more input devices 1440 such as a keyboard and a pointing device such as a mouse. Other input devices may include a digital camera, microphone, joystick, game pad, satellite dish, scanner, or the like. These and other input devices are often connected to the one or more processing units 1402 through a serial port interface that is coupled to the system bus 1406, but may be connected by other interfaces such as a parallel port, game port, or universal serial bus (USB). Output devices 1445 can also be coupled to the system bus 1406. A monitor 1446 or other type of display device is also connected to the system bus 1406 via an interface, such as a video adapter. Other peripheral output devices, such as speakers and printers (not shown), may be included.

The PC 1400 may operate in a networked environment using logical connections to one or more remote computers, such as a remote computer 1460. In some examples, one or more network or communication connections 1450 are included. The remote computer 1460 may be another PC, a server, a router, a network PC, or a peer device or other common network node, and typically includes many or all of the elements described above relative to the PC 1400, although only a memory storage device 1462 has been illustrated in FIG. 14.

In typical examples, some or all of the above processor-based system is provided in a handheld device, either with a dedicated processor or in a tablet computer or smart phone. These latter devices include user interface devices such as displays and touch screens, sufficient computational power, and communication hardware via a cellular network or other wireless network such a as a WiFi network. As shown in FIG. 14, the memory 1404 can include a portion 1404A that stores instructions for determining analyte concentrations, sensor system control such as activation of a light source, setting a gain or bias for one or more photodetectors, normalizing sensor detection signals, and interpolation of calibration data that is stored in a memory portion 1404B. Such stored data can include look-up tables or values associated with a curve fit.

In view of the many possible embodiments to which the principles of the disclosed technology may be applied, it should be recognized that the illustrated embodiments are only examples and should not be taken as limiting the scope of the disclosure. We therefore claim as our invention all that comes within the scope and spirit of the appended claims.

We claim:

1. A sensor, comprising:
   a light guide having a proximal surface and a distal surface, wherein the distal surface is situated to receive light directed into the light guide at the proximal surface;
   a sensor material responsive to a selected analyte and situated to receive light from the distal surface of the light guide;
   a detector optically coupled to the sensor material to receive light from the sensor material; and
   a sensor processor coupled to the detector to receive an indication of a sensor material response to the selected analyte and configured to determine an analyte concentration by calculating using a rate of change of an optical property of the sensor material upon exposure to the analyte.

2. The sensor of claim 1, wherein the optical property is transmittance and the sensor material is an aluminum layer having a thickness of between 15 nm and 500 nm.

3. The sensor of claim 1, wherein the optical property is reflectance and the sensor material is an aluminum layer having a thickness of between 15 nm and 500 nm.

4. The sensor of claim 3, wherein the light guide is an optical fiber, and the sensor material is situated on the distal surface.

5. The sensor of claim 4, wherein the distal surface is a cleaved or polished surface of the light guide.

6. The sensor of claim 5, wherein the sensor processor determines the rate of change of the optical property based on a slope of a selected portion of an optical response as a function of time.

7. The sensor of claim 6, wherein the selected portion of the optical response as a function of time extends between an upper limit that is less than 90% of a peak optical response and a lower limit that is more than 10% of the peak optical response.

8. The sensor of claim 6, wherein the selected portion of the optical response as a function of time extends between an upper limit that is less than 85% of a peak optical response and a lower limit that is more than 20% of the peak optical response.

9. The sensor of claim 6, wherein the sensor processor determines the rate of change of the optical property by determining a time associated with a specified change in the optical response.

10. The sensor of claim 9, wherein the change in the optical response is a decrease in the optical response.

11. The sensor of claim 9, wherein the specified change in the optical response is a decrease to 50% of a peak optical response.

12. A method, comprising:
    exposing a metallic layer to a sample;
    directing light to the metallic layer and receiving a portion of the light from the metallic layer;
    determining a change in the portion of the light received from the metallic layer in an exposure time interval; and
    indicating an analyte concentration in or indicating presence of an analyte in the sample via a calculation using a rate of change in the portion of the light received from the metallic layer.

13. The method of claim 12, wherein the received portion is reflected or transmitted by the metallic layer.

14. The method of claim 12, wherein the analyte concentration or the presence of an analyte is based on slopes of a linear portion of optical responses to a plurality of analyte concentrations.

15. The method of claim 12, wherein the metallic layer is an aluminum layer having a thickness between 10 nm and 50 nm.

16. The method of claim 12, wherein the metallic layer is situated on an end face of an optical fiber, and the light is directed to the metallic layer by the optical fiber.

17. The method of claim 16, wherein the received portion of the light is a reflected portion that is directed to a detector through the optical fiber.

18. The method of claim 17, wherein the optical fiber is a single mode fiber.

19. The method of claim 12, wherein the analyte concentration or presence of the analyte is indicated based on slopes of portions of sensor detection signals as functions of exposure time corresponding to optical responses to a plurality of analyte concentrations, wherein the portions of the sensor detection signals are associated with sensor detection signals between 10% and 90% of a maximum sensor detection signal.

20. The method of claim 17, wherein the optical fiber is a multimode fiber.

21. A sensor system, comprising:
    a light source adapted to produce light in a wavelength range of 1.0 μm to 1.7 μm;
    an optical fiber coupler situated to receive the light from the light source;
    an optical fiber having a proximal surface situated to receive the light from the optical fiber coupler and a planar distal surface that is perpendicular to an axis of the optical fiber;
    an aluminum layer situated on the distal surface of the optical fiber and having a thickness of between 30 nm and 40 nm;
    a detector optically coupled to the optical fiber coupler and situated to receive light portions returned from the aluminum layer and produce a sensor detection signal; and a sensor processor coupled to the detector to receive the sensor detection signal and produce an indication of an analyte concentration by calculating using a rate of change of the sensor detection signal.

* * * * *